3,488,396
DINITROHALO COMPOUNDS
Milton B. Frankel, Tarzana, and Gerald L. Rowley, Van Nuys, Calif., assignors to North American Rockwell Corporation, a corporation of Delaware
No Drawing. Filed July 10, 1967, Ser. No. 652,662
Int. Cl. C07c 79/12
U.S. Cl. 260—644    11 Claims

ABSTRACT OF THE DISCLOSURE 1,4-dinitro-1,4-dihalo-1,3-butadiene and 1,4-dinitro-1,2,3,4-tetrahalobutane and a method of production using the starting compound 1,4-dinitro-2-butene; reacting that with an alkaline metal or alkaline earth to produce an alkaline salt of that compound; reacting that salt with a halide to produce 1,4-dinitro-1,3-butadiene; and subsequently reacting that compound with a halogen and, if necessary, dehydrohalogenating the resulting tetrahalo compound. These compounds are useful as explosives and binders in rocket propellants.

BACKGROUND OF THE INVENTION

There is a continual need for new high energy compounds to serve as explosives and binders in rocket propellants. Consequently, new compounds are constantly being synthesized to add to the existing family of high energy compounds. Examples of such compounds would be 1,4-dinitro-1,2,3,4-tetrabromobutane and 1,4-dinitro-1,4-difluoro-1,3-butadiene. It can be seen that these compounds and their analogs would be potentially useful as intermediates for the synthesis of energetic explosives or energetic monomers.

PRIOR ART

The conversion of 1,4-dinitro-1,3-butadiene to a dibromide has been reported by Perekalin, V. V. and O. M. Lerner—DAN SSSR., vol. 129; 1303 (1959). However, the corresponding tetrabromide has not been reported. Moreover, the production of 1,4-dinitro-1,3-butadiene has heretofore been a difficult synthesis. As reported in the cited reference, the synthesis involves the chlorination of 1,4-dinitro-2-butene over a period of seven or eight days to produce the dichloride. The dichloride is then reacted with lead acetate and acetic acid to produce 1,4-dinitro-1,3-butadiene. The net yield is about 30%. Another method used in the prior art, as reported by Novikov, S. S., I. S. Korsakova, and K. V. Babievskii, Izv. AN SSSR, p. 944 (1960), involves the condensation of nitromethane with glyoxal, the acylation of the nitro glycol produced, and dehydroacylation of the resulting diacetate to give the desired product. Both of these 1,4-dinitro-1,3-butadiene syntheses have the disadvantage of being complicated, involving several steps, and giving poor yields.

It is an object of this invention to provide intermediates for the synthesis of energetic explosives or energetic monomers.

It is a further object of this invention to provide the new compounds 1,4-dinitro-1,4-dihalo-1,3-butadiene.

It is a further object of this invention to provide a new process for the synthesis of 1,4-dinitro-1,2,3,4-tetrahalobutane.

It is a further object of this invention to provide a new process for the synthesis of 1,4-dinitro-1,2,3,4-tetrabromobutane.

It is a still further object of this invention to provide an improved process of the synthesis of 1,4-dinitro-1,3-butadiene.

Further objects of this invention will become apparent from the following description.

BRIEF DESCRIPTION OF THE INVENTION

The process of the instant invention involves the reaction of 1,4-dinitro-2-butene with a compound selected from the group consisting of alkali metal hydroxides and alkaline earth hydroxides to produce an alkaline salt of 1,4-dinitro-2-butene; subsequently reacting the alkaline salt with a halogen, thereby producing 1,4-dinitro-1,3-butadiene; separating said 1,4-dinitro-1,3-butadiene; halogenating said 1,4-dinitro-1,3-butadiene, thereby producing 1,4-dinitro-1,2,3,4-tetrahalobutane; separating said 1,4-dinitro-1,2,3,4-tetrahalobutane; reacting said 1,4-dinitro-1,2,3,4-tetrahalobutane with water, thereby producing 1,4-dinitro-1,4-dihalo-1,3-butadiene; and separating said 1,4-dinitro-1,4-dihalo-1,3-butadiene. The reactions of the instant invention can be summarized by the following equations:

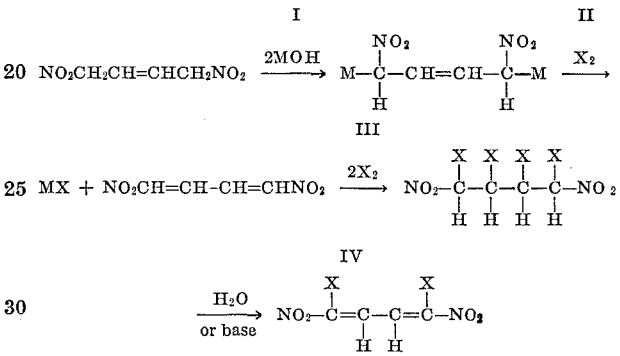

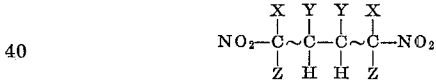

wherein M is an alkali metal or an alkaline earth and X is a compound selected from the group consisting of fluorine, chlorine, bromine and iodine, the halogens.

The novel compounds resulting from Reactions III and IV can be described by the general formula:

$$NO_2-\underset{Z}{\overset{X}{C}}\sim\underset{H}{\overset{Y}{C}}-\underset{H}{\overset{Y}{C}}\sim\underset{Z}{\overset{X}{C}}-NO_2$$

where ~ can be a single or double bond; but if ~ is a single bond, Y is X, and Z is H; but if ~ is a double bond, Y and Z are not present; and X is as previously defined.

Reactions I and II are unexpectedly useful syntheses to give the known product 1,4-dinitro-1,3-butadiene. The product of Reaction I can be allowed to remain in solution, and the synthesis immediately continues upon the addition of halogen, producing 1,4-dinitro-1,3-butadiene, an intermediate, in a high precentage yield and with an ease heretofore unobtainable.

Reaction I is preferably conducted at temperatures of between −10° C. and +25° C. When temperatures of below about −10° C. are used, the reaction proceeds at an unfeasibly slow rate. If temperatures much above +25° C. are used, undesirably large amounts of side products are formed.

Reaction II is preferably conducted at temperatures of between 0° C. and about 25° C. The temperature limits are dictated by the same considerations as those for Reaction I.

Reactions I and II are most conveniently carried out with an alcohol solvent such as methanol, ethanol, propanol or isopropanol. An aqueous alcoholic solvent is used so as to dissolve both the starting 1,4-dinitro-2-butene and the starting hydroxide. If dialkaline earth salt or dialkali metal sale precipitates from this solution, it can be separated for later reaction, or can be redissolved by the addition of water to immediately proceed to the next step, Reaction II, in the synthesis. The next step, the first halogenation step, can be conveniently carried out by the addition of an alcohol solution of a halogen to the reaction mixture, or by the bubbling of the halogen through the reaction mixture, or by other means of halogenation known to the art.

For ease of synthesis, it is preferred that the product of Reaction I

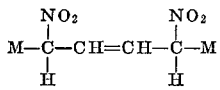

be formed in situ. Yields of the product of Reaction II, 1,4-dinitro-1,3-butadiene, on the order of 80% after a 15-minute reaction time can be expected if the preferred mode of practice of Reactions I and II is used.

After separation by precipitation from aqueous solution and washing, 1,4-dinitro-1,3-butadiene can be halogenated to produce 1,4-dinitro-1,2,3,4-tetrahalobutane, according to Reaction III. It should be noted that the halogen of Reaction III need not be the same as that of Reaction II, so that halogen is no longer present in the starting materials of Reaction III, and will not interfere. The products of Reaction II do not proceed to react appreciably according to Reaction III as long as the temperature of the reactants is kept below about 40° C. Correspondingly, about 60° C. is preferred for the synthesis of Reaction III. A range of temperature operation of from 40° C. to about 80° C. is preferred.

Reaction III, the second halogenation, can be carried out by means known in the art, for instance, a bubbling of an elemental halogen into a solution of 1,4-dinitro-1,3-butadiene. The preferred method of halogenation is to react the 1,4-dinitro-1,3-butadiene and the halogen in an inert solvent, for example chloroform. The halogenation is of a type well known in the art and those skilled in the art will be aware of other methods of halogenation.

The process of Reaction IV is termed a dehydrohalogenation. As in the prior art, it can be performed with a base. Dehydrohalogenation can by achieved with only water. This would not be predicted from the prior art, and is surprising and unexpected. It is preferred that the water be mixed with an alcoholic solvent, e.g., methanol or ethanol, to promote the solubility of the reactants. Naturally the two remaining halogens on the butadiene backbone after Reaction IV will be the same as the four halogens present after Reaction III.

The following examples illustrate the novel compositions and processes of this invention.

Example I 1,4-dinitro-1,3-butadiene was directly prepared in high yielded by the treatment of 1,4-dinitro-2-butene with potassium hydroxide and bromine. Methanolic potassium hydroxide (28.6 ml., 0.98 N) was added in small portions with stirring to 1,4-dinitro-2-butene (2.05 gm., 14 mmoles) slurried in 15 ml., of methanol, cooled to −10° C. A small amount of precipitated dipotassium salt was dissolved by the addition of 15 ml., of water to give a dark solution. This cold solution and an equivalent volume of methanolic bromine solution (2.46 gm., 15.4 mmoles, 10% excess) were added dropwise simultaneously to 90 ml. of water stirred at 0° C. The solution became yellow and a yellow solid precipitated after several minutes. An excess of bromine was maintained at all times and the temperature was maintained at or somewhat below 0° C. Stirring was continued for one hour after the final addition followed by pouring the mixture into 300 ml. of water. The yellow solid was filtered, washed with several portions of water and dried in vacuo to yield 1.60 gm. (79%), M.P. 133–142° C. decomp. Recrystallization from chloroform yielded pale yellow needles, M.P. 145.5–147.5° C. decomp.

$\lambda_{max.}^{Nujol}$ 6.7$\mu$, 7.5$\mu$

*Analysis.*—Calcd. for $C_4H_4N_2O_4$: C, 33.34%; H, 2.80%. Found: C, 33.09%, 32.96%; H, 2.72%, 2.89%.

1,4 - dinitro - 1,2,3,4 - tetrabromobutane was prepared from the 1,4-dinitro-1,3-butadiene (10.78 grams, 75 mmoles) and bromine (26.4 grams, 165 mmoles, 10% excess). The two starting reactants were refluxed for one hour in 125 milliliters of chloroform. The reaction was protected from light by wrapping with aluminum foil. An orange syrup was obtained on evaporation of solvent and excess bromine under reduced pressure. This syrup was extracted with multiple portions of boiling hexane until a small quantity of dark residue remained. Evaporation of the hexane under reduced pressure yielded an amber syrup (32.05 grams, 92%). The syrup crystallized very slowly in an ice box after being seeded. Two recrystallizations from hexane yielded the analytical sample as colorless prisms. Melting point, 83.5 to 84.5° C.

$\lambda_{max.}^{Nujol}$ 6.4$\mu$, 7.4$\mu$

*Analysis.*—Calcd. for $C_4H_4Br_4N_2O_4$: C, 10.36%; H, 0.87%. Found: C, 10.48%, 10.37%; H, 0.89%, 0.76%.

The resulting 1,4 - dinitro - 1,2,3,4 - tetrabromobutane can then be treated with $NO_2$ ions, producing a highly energetic polynitrobutane compound, suitable for use as an explosive or an energetic binder.

The 1,4 - dinitro - 1,2,3,4 - tetrabromobutane (11.6 grams, 25 mmoles) was dissolved in 50 milliliters of methanol and 5 milliliters of water was added. The resulting yellow solution was allowed to stand 20 hours at ambient temperature. The yellow needles which had crystallized from solution were washed once with a small quantity of methanol and dried to yield 5.41 grams with a melting point of 125.5 to 127° C. A second crop (0.72 gram, melting point, 124.5 to 126.5) was obtained by concentration of mother liquor to yield a total of 6.13 grams, 81%. One recrystallization of the first crop from methanol yielded the following analytical sample: Melting point, 126 to 127.5° C.

$\lambda_{max.}^{Nujol}$ 6.6, 7.7, 10.6, 12.7$\mu$

*Analysis.*—Calcd. for $C_4H_2Br_2N_2O_4$: C, 15.91%; H, 0.67%; N, 9.28%. Found: C, 15.80%, 15.76%; H, 0.76%, 0.65%; N, 9.38%.

Example II

A synthesis identical to that of Example I is performed, except that Mg and $Cl_2$ are used instead of K and $Br_2$. 1,4-dinitro-1,3-butadiene is produced in good yield, and is chlorinated to produce 1,4 - dinitro - 1,2,3,4 - tetrachlorobutane. This is then dehydrohalogenated with aqueous ethanol to produce 1,4-dinitro-1,4-dichloro-1,3-butadiene.

Example III

A synthesis identical to that of Example I is performed, except that Na is used instead of K. 1,4-dinitro-1,3-butadiene is produced in good yield, and is fluorinated to produce 1,4-dinitro-1,2,3,4-tetrafluorobutane. This is then dehydrohalogenated with aqueous isopropanol to produce 1,4-dinitro-1,4-difluoro-1,3-butadiene.

Since it is obvious that many changes and modifications can be made in the above described details without departing from the nature and spirit of the invention, it is to be understood that the invention is not to be limited thereto except as set forth in the appended claims.

We claim:
1. The compounds

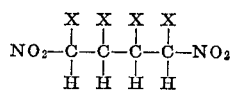

or

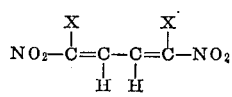

wherein X is fluorine, chlorine, bromine or iodine.

2. The compound

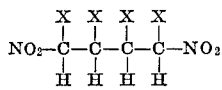

of claim 1 wherein X is Br.

3. The compound

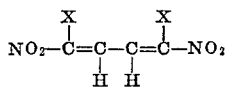

of claim 1 wherein X is Br.

4. The process comprising,
   the reaction of 1,4-dinitro-2-butene with a compound selected from the group consisting of alkali metal hydroxides and alkaline earth hydroxides to produce an alkaline salt of 1,4-dinitro-2-butene;
   subsequently reacting the alkaline salt with a halogen, thereby producing 1,4-dinitro-1,3-butadiene;
   separating said 1,4-dinitro-1,3-butadiene;
   halogenating said 1,4-dinitro-1,3-butadiene at a temperature of from about 40° C. to about 80° C., thereby producing 1,4-dinitro-1,2,3,4-tetrahalobutene; and
   separating said 1,4-dinitro-1,2,3,4-tetrahalobutene.

5. The process of claim 4 comprising the additional steps of reacting the 1,4-dinitro-1,2,3,4-tetrahalobutane with water or a base, thereby producing 1,4-dinitro-1,4-dihalo-1,3-butadiene; and separating said 1,4-dinitro-1,4-dihalo-1,3-butadiene.

6. The process of claim 5 wherein water is used.

7. The process of claim 4 wherein the second halogenation is performed with bromine.

8. The process of claim 4 wherein the reaction to produce the alkaline salt of 1,4-dinitro-2-butene is performed at between −10° C. and +25° C. and the 1,4-dinitro-1,3-butadiene is produced at between 0° C. and about 25° C.

9. The process of producing 1,4-dinitro-1,3-butadiene comprising,
   reacting 1,4-dinitro-2-butene with a compound selected from the group consisting of alkali metal hydroxides and alkaline earth hydroxides to produce an alkaline salt of 1,4-dinitro-2-butene;
   subsequently reacting the alkaline salt with a halogen, thereby producing 1,4-dinitro-1,3-butadiene; and
   separating said 1,4-dinitro-1,3-butadiene.

10. The process of claim 9 wherein the halogen is bromine.

11. The process of claim 9 wherein the alkaline salt of 1,4-dinitro-2-butene is produced at a temperature of between −10° C. and +25° C. and the 1,4-dinitro-1,3-butadiene is produced at a temperature of between 0° C. and about 25° C.

References Cited

UNITED STATES PATENTS

| | | | |
|---|---|---|---|
| 2,837,578 | 6/1958 | Brown | 260—644 |
| 2,874,195 | 2/1959 | Bachman et al. | 260—644 |

FOREIGN PATENTS

| | | |
|---|---|---|
| 141,722 | 2/1949 | Australia. |

LELAND A. SEBASTIAN, Primary Examiner

U.S. Cl. X.R.

149—88